US012224514B2

(12) United States Patent
Dobler

(10) Patent No.: US 12,224,514 B2
(45) Date of Patent: Feb. 11, 2025

(54) ELECTRICAL PLUG CONNECTOR WITH GUIDE FEATURES AND CENTRAL AND OUTER INSERTION OPENINGS

(71) Applicant: Neutrik AG, Schaan (LI)

(72) Inventor: Oliver Dobler, Tschagguns (AT)

(73) Assignee: NEUTRIK AG, Schaan (LI)

( * ) Notice: Subject to any disclaimer, the term of this patent is extended or adjusted under 35 U.S.C. 154(b) by 363 days.

(21) Appl. No.: 17/628,480

(22) PCT Filed: Jul. 31, 2020

(86) PCT No.: PCT/EP2020/025351
§ 371 (c)(1),
(2) Date: Jan. 19, 2022

(87) PCT Pub. No.: WO2021/023396
PCT Pub. Date: Feb. 11, 2021

(65) Prior Publication Data
US 2022/0399667 A1 Dec. 15, 2022

(30) Foreign Application Priority Data
Aug. 7, 2019 (AT) .............................. A 50701/2019

(51) Int. Cl.
*H01R 13/11* (2006.01)
*H01R 4/48* (2006.01)
(Continued)

(52) U.S. Cl.
CPC ............. *H01R 13/111* (2013.01); *H01R 4/48* (2013.01); *H01R 13/05* (2013.01); *H01R 13/17* (2013.01);
(Continued)

(58) Field of Classification Search
CPC ........ H01R 13/111; H01R 4/48; H01R 13/05; H01R 13/17; H01R 13/40; H01R 13/631;
(Continued)

(56) References Cited

U.S. PATENT DOCUMENTS 5,527,190 A 6/1996 Weingartner
5,911,601 A 6/1999 Weingartner
(Continued)

FOREIGN PATENT DOCUMENTS

AT 387 871 B 3/1989
AT 410 865 B 8/2003
(Continued)

OTHER PUBLICATIONS

International Search Report in PCT/EP2020/025351, mailed Oct. 29, 2020.

*Primary Examiner* — Justin M Kratt
(74) *Attorney, Agent, or Firm* — Volpe Koenig

(57) ABSTRACT

An electrical plug connector has a housing, in which at least one insertion opening and at least one guide for a complementary plug connector with at least one electrical contact pin are arranged. At least one contact element that is elastically deflectable out of the path of the contact pin is mounted in the housing and at least partially protrudes into the insertion opening when the complementary plug connector is absent. The lateral edge of the contact element facing the contact pin, in its front section, encloses an acute angle with the path of the contact pin during the insertion when viewed in the direction of the deflection of the contact element. When the cable plug connector is fully inserted, a flat contact section of the contact element, adjoining the lateral edge, in the transverse direction abuts in contact with the contact pin.

10 Claims, 9 Drawing Sheets

Figure 1:
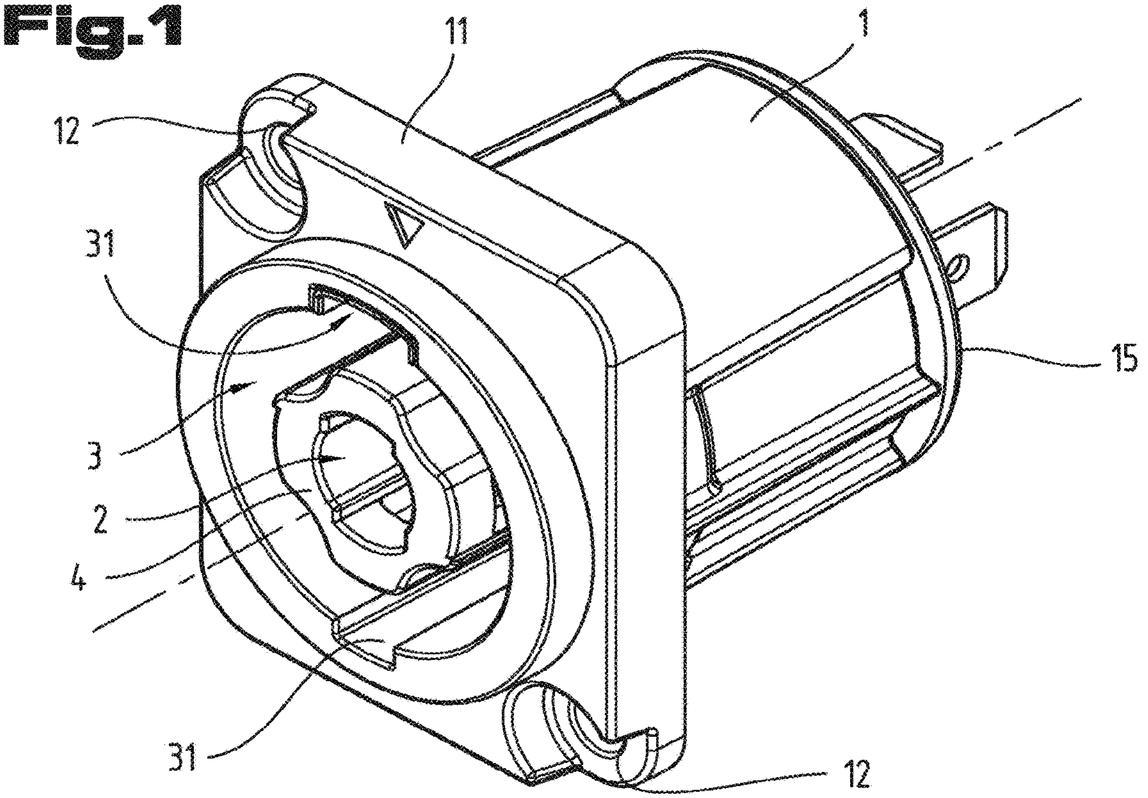

(51) Int. Cl.

| | |
|---|---|
| ***H01R 13/05*** | (2006.01) |
| ***H01R 13/17*** | (2006.01) |
| ***H01R 13/40*** | (2006.01) |
| ***H01R 13/631*** | (2006.01) |
| ***H01R 24/58*** | (2011.01) |
| *H01R 13/02* | (2006.01) |
| *H01R 13/04* | (2006.01) |
| *H01R 13/08* | (2006.01) |
| *H01R 13/15* | (2006.01) |
| *H01R 13/26* | (2006.01) |
| *H01R 24/38* | (2011.01) |
| *H01R 24/60* | (2011.01) |
| *H01R 27/00* | (2006.01) |
| *H01R 103/00* | (2006.01) |

(52) U.S. Cl.

CPC ........... *H01R 13/40* (2013.01); *H01R 13/631* (2013.01); *H01R 24/58* (2013.01); *H01R 13/02* (2013.01); *H01R 13/04* (2013.01); *H01R 13/052* (2013.01); *H01R 13/08* (2013.01); *H01R 13/15* (2013.01); *H01R 13/26* (2013.01); *H01R 24/38* (2013.01); *H01R 24/60* (2013.01); *H01R 27/00* (2013.01); *H01R 2103/00* (2013.01)

(58) Field of Classification Search

CPC ........ H01R 24/58; H01R 13/02; H01R 13/04; H01R 13/052; H01R 13/08; H01R 13/15; H01R 13/26; H01R 24/38; H01R 24/60; H01R 27/00; H01R 2103/00

See application file for complete search history.

(56) References Cited

U.S. PATENT DOCUMENTS

| | | | | |
|---|---|---|---|---|
| 2001/0014560 | A1 | 8/2001 | Daugherty et al. | |
| 2006/0205288 | A1 | 9/2006 | Chung | |
| 2016/0172799 | A1* | 6/2016 | Endo | H01R 13/111 439/733.1 |

FOREIGN PATENT DOCUMENTS

| | | | | |
|---|---|---|---|---|
| CN | 101523670 | B | 9/2009 | |
| CN | 204156154 | U | 2/2015 | |
| EP | 1 401 056 | A1 | 3/2004 | |
| EP | 1503463 | A1 * | 2/2005 | H01R 24/58 |
| GB | 2 209 635 | B | 8/1991 | |
| JP | H08-78081 | A | 3/1996 | |
| JP | 2005317262 | | 11/2005 | |
| JP | 2012252974 | | 12/2012 | |
| JP | 2018530139 | | 10/2018 | |

* cited by examiner

ELECTRICAL PLUG CONNECTOR WITH GUIDE FEATURES AND CENTRAL AND OUTER INSERTION OPENINGS

CROSS REFERENCE TO RELATED APPLICATIONS

This application is the National Stage of PCT/EP2020/025351 filed on Jul. 31, 2020, which claims priority under 35 U.S.C. § 119 of Austrian Application No. A 50701/2019 filed on Aug. 7, 2019, the disclosure of which is incorporated by reference. The international application under PCT article 21 (2) was not published in English.

The invention relates to an electrical plug connector having a housing, which has a central insertion opening and at an outer annular insertion opening, wherein the outer insertion opening surrounds the central insertion opening and is delimited from the central insertion opening by an equally coaxial cylindrical partition wall, which extends at least over a part of the circumference of the insertion opening. At least one guide for a complementary plug connector with at least one electrical contact pin ensures the rotation-free insertion of the complementary plug connector into the insertion opening and enable a subsequent rotation about the central axis of the plug connectors. In the insertion opening, at least one flat electrical contact element with a tongue-shaped design that can be elastically deflected out of the path of the contact pin is mounted, which contact element at least partially projects into the insertion opening, wherein a flat contact section, adjoining the lateral edge in the transverse direction, abuts in contact with the contact pin when the complementary plug connector is absent fully inserted. The first contact element is arranged in the region of the outer side of the partition wall so as to extend in parallel with the axis of the insertion openings and can be resiliently deflected in the direction towards the longitudinal axis of the housing, which ensures an optimal electrical contacting.

Such plug connectors are usually used for audio applications, in particular as loudspeaker plugs, partially also as plugs for the power supply of electrical devices. A preferred application are housings for plug connectors for connecting loudspeakers and amplifiers for two standards of plug connectors, which are to be inserted into a corresponding built-in plug socket in the loudspeaker and/or amplifier. A type of cable plugs has a central pin-shaped plug extension and an annular plug extension surrounding the same, while, on the other hand, typical jack plugs may be provided as cable plugs. The present invention particularly relates to the plug receiving parts of an electrical plug connection, which is designed to establish an electrically conductive plug connection with a complementary plug part, wherein electrical contacts are arranged in both plug connectors. The plug receiving parts are often designed as built-in plug sockets, also referred to as chassis plugs. They have an annular insertion opening for establishing an electrical plug connection, on whose side wall at least one electrical contact element is provided, as it is known, for example, from AT 387 871 B1. This contact element can be contacted by a contact element of a pluggable mating plug of the plug connection, which mating plug has an annular plug extension for plugging into the annular insertion opening of the plug receiving part.

Moreover, a chassis plug socket, which has a central insertion opening in addition to the annular insertion opening, which also has an electrical contact element on a side wall, is known. The corresponding mating plug of the plug connection has a central pin-shaped plug extension for plugging into the central insertion opening in addition to the annular plug extension. Such plug connectors are widely used particularly as loudspeaker plugs.

Moreover, plug connections are known, inter alia also for establishing cable connections between amplifiers and loudspeakers, whose plug part is formed by a jack plug. Jack plugs are described, for example in U.S. Pat. Nos. 5,911,601 A and 5,527,190 A and the references cited therein.

For example for connecting loudspeakers and amplifiers, two standards of cable plugs, which are to be plugged into a corresponding chassis plug socket in the loudspeaker (and/or amplifier), are thus widely used, wherein the one type of these cable plugs has a central pin-shaped plug extension, as well as an annular plug extension surrounding the same, as mentioned above, and in the other one of these standards, a jack plug is provided as the cable plug. In order to avoid additional effort and expense regarding the components but also regarding the wiring work to be performed for the use of both systems, AT 410 865 B1 has suggested a switchover device so that the usual polarity of the contacts for these different types of plugs can be maintained.

From EP 1503463 A1, on the other hand, an integrated socket of an electrical plug connection with a socket housing is known, which comprises a central insertion opening and an annular insertion opening surrounding the central insertion opening and delimited relative to the central insertion opening by a partition wall. First and second electrical contact elements are present, wherein a central plug extension is insertable into the central insertion opening, and an annular plug extension of a mating plug is insertable into the annular insertion opening, and a first electrical mating contact element arranged on the central plug extension is contactable to the first contact element, and a second electrical mating contact element arranged on the annular plug extension is contactable to the second electrical contact element. Alternatively, a jack plug can be inserted into the central insertion opening as a mating plug, and a shaft of the jack plug and a contact tip of the jack plug arranged at the free end of the shaft are electrically contactable.

US2006/0205288 A1 discloses a contact element, which is configured to be mounted on a circuit board and to contact a contact pin insertable in parallel with the contact element. The outermost end section of the contact element has a convex curvature against the direction of deflection and moreover has a concave curvature in the transverse direction, which concave curvature arcuately rests on the end section of the contact pin.

EP 1401056 A1 discloses a plug receiving part of an electrical plug connection, in particular for audio applications, whose housing has a central receiving space, which is bounded by a partition wall with an inner side and an outer side, and an annular receiving space surrounding the partition wall, wherein both receiving spaces form insertion openings for a complementary mating plug. Both on the inner side and on the outer side of the partition wall, electrical plug contacts are arranged, which have a metallic, strip-shaped body, which has a fastening region and a free arm protruding from the fastening region and having a contact region at its free end and a springy region located between the contact region and the fastening region. In the usual fields of application of these plug receiving part for audio applications, in particular as loudspeaker plugs, partially also as plugs for the power supply of electrical devices, relatively high currents must be transferable, wherein low transfer resistances are important, for which, on the one hand, a very good conductivity and, on the other hand, good spring properties are demanded so that the plug contact is pressed against its mating contact with sufficient force. The suggested contact element has a fastening region and a free arm protruding from the fastening region and having a contact region and a springy region, wherein the contact region is designed to be curved. For reinforcing the free arm, a bulge, and a corresponding depression on the side of the strip-shaped body opposite the bulge is formed, wherein the springy region of the strip-shaped body is designed to be curved in the region of the bulge and/or depression as viewed in the cross-section. Thereby, the spring properties are influenced positively, and the bulge also guarantees a good start-up slope in all directions upon contacting.

JP H0878081 A and US 2001014560 A1 show a plug socket, which is used for round plugs for car charger plugs and/or a crimp contact for a pin with a round cross-section.

The contact elements of both arrangements are approximately cylindrical, wherein multiple elongated webs separated by punchings are arranged in the central sleeve region. The webs are rotated along their longitudinal extension.

According to JP H0878081 A, the webs are slightly widened in their central section, so that, upon rotation, a contact edge protrudes into the receiving region for the plug pin. When it is inserted, the plug pin partially rotates the web back against its initial rotation, wherein the contact between the plug pin and the web is always maintained by the contact edge of the web.

US 2001014560 A1, however discloses webs, which are deflected laterally out of the longitudinal axis along their longitudinal extension and when the contact element is finished, protrude into the insertion opening for the pin and form a contact edge with the pin.

The object of the present invention was to achieve a good start-up slope and the transferability of high currents by means of good electrical contacting with a simpler structure of the plug connector and its contact elements.

This object is achieved by a device according to the claims.

The device according to the invention is additionally characterized in that the first contact element is arranged in the region of the outer side of the cylindrical partition wall so as to extend in parallel with the axis of the insertion openings, is curved convexly in the direction away from the central longitudinal axis of the housing and is resiliently deflectable in the direction towards the central longitudinal axis of the housing, and that the lateral edge of the contact element facing the contact pin, in its front section facing the contact pin, encloses an acute angle with the path of the contact pin during the insertion when viewed in the direction of the deflection of the contact element. In the geometric sense, the path of the contact pin and the tangent to the contact point of the contact element are skew lines as they are not situated within the same plane. When inserting the contact pin into the housing according to the invention, its front end, usually designed as a rounded structure, contacts the lateral edge of the contact element of the housing first and upon further insertion and sliding along the lateral edge deflects the same elastically out of the rest position. This relative movement with sliding along-similar to the principle of the cutting edges of a pair of scissors-takes place until the front section of the contact pin has run onto the flat side of the contact element. The contact pin may then either be pushed further forward or be moved away from the lateral edge of the contact element towards its flat surface by rotation of the complementary plug connector—for example as part of a bayonet-type lock of the plug connection—transversely to the longitudinal axis of the contact element.

An embodiment, in which the contact element has a convex curvature against the direction of deflection, which results in a gentle mechanical contacting between the contact pin and the contact element as well as an advantageous force curve and/or resistance curve, is preferred.

Preferably, the apex region of the curved section of the contact element is situated in the region of the foremost section of the contact pin when the complementary plug connector is fully inserted. This provides for an optimal press-on effect of the contact element onto the contact pin and for the existence of the greatest possible contacting surface between the two electrical contacts.

A further preferred embodiment provides that the contact element has a convex curvature transverse relative to its longitudinal axis in the direction towards the contact pin. In this regard, this second curvature is a curvature that is transverse relative to the longitudinal axis of the contact element and can only affect the lateral edge which comes into contact with the contact pin. However, the curvature may also affect both lateral edges, which then leads to a contact element both curved perpendicularly to the plane between the lateral edges and/or crescent-shaped.

It is again advantageous if the apex region of the curvature is situated in the region of the foremost section of the contact pin when the complementary plug connector is fully inserted.

Even when inserting the contact pin into the housing according to the invention along a straight path, the contact section of the contact element then comes into optimal contact with the front section of the contact pin. This advantage is amplified if, to complete the establishment of the plug connection, a rotation of the complementary plug connector against the lateral curvature of the contact element takes place, for example for securely locking the plug connection.

A particularly advantageous embodiment of a plug connector according to the invention is characterized in that the front section of the contact element cooperating with the contact pin is rotated in the direction towards the contact pin. This rotation in the circumferential direction about the longitudinal axis of the contact element and in the direction towards the path of the contact pin facilitates, on the one hand, the smooth and steady deflection of the contact element when inserting the contact pin into the housing and also the sliding of the contact pin onto the surface of the contact element, be it in the longitudinal direction of the contact element and/or in its transverse direction. Additionally, it ensures optimal contacting at any point in time and in any relative position of the contact pin and the contact element.

In this regard, a variant in which the rotation of the tangential section steadily increases up until shortly before the front end of the contact element is preferred.

Instead of designing the lateral edge of the contact element which comes into contact with the contact pin to have a curvature, it is also possible for a contact element with a rotated front section to achieve the desired curvature with respect to the path of the contact pin by the lateral edge cooperating with the contact pin extending in parallel with the longitudinal center of the contact element and the acute angle, as viewed in the direction of the deflection of the contact element, between the path of the contact pin and the lateral edge being effected by the rotation of the contact element. Thereby, the contact element can be produced more easily as only straight lateral edges are required while the force curve in the course of the insertion of the contact pin and deflection of the contact element is still smooth.

In this regard, the contact element is preferably guided coaxially relative to the insertion direction at its end closest to the insertion side, wherein the contacting surface of the first contact element is situated between its end sections—that is the end of the contact element defined on the housing and the other end, which is guided coaxially relative to the housing longitudinal axis.

An advantageous embodiment of such a plug connector has two contact elements, which are arranged on opposite sides of the plug connector with respect to the axis of the insertion opening, are curved convexly in the direction away from the central longitudinal axis of the housing and are resiliently deflectable in the direction towards the central longitudinal axis of the housing.

In order to be able to contact the second type of complementary plug connectors, at least a second contact element is arranged in the central insertion opening and is resiliently deflectable in the direction away from the central longitudinal axis of the housing.

The material and weight savings as well as a structure with small dimensions allows a variant of the plug connector, which is characterized in that the partition wall, which separates the central insertion opening from the annular insertion opening delimited therefrom, is at least partially hollow. As an alternative or an addition thereto, the partition wall may also be provided with at least one groove-like recess. In the cavity and/or in the groove, at least one of the contact elements is arranged. Preferably, two grooves or cavities are provided, which each accommodate one of the contact elements. The partition wall may also be designed as a hollow-cylindrical ring, which has openings or grooves, which accommodate the contact elements or allow that they protrude into the region in which the contact pins or similar contact elements of the complementary plug connector come to rest during or after the plug connection has been established.

Preferably, such a plug connector is designed as a so-called "chassis socket" as described in the preceding paragraphs, wherein their housing is designed as a socket-shaped housing that is insertable into a plate, housing wall, or the like and has a protruding flange on the insertion side for being mounted on the plate, housing wall or the like. The electrical contact elements are defined at the rear end, which is opposite the insertion opening for the complementary plug connector, on the base of the socket-shaped housing.

An advantageous embodiment for the application with jack plugs, as well, is characterized in that the central insertion opening is configured to receive a jack plug, and contact elements for the shaft of the jack plug and a contact tip of the jack plug arranged at the free end of the shaft are present, which comprise at least a first contact lug electrically connected to the first contact element, by which first contact lug the contact tip of the jack plug can be contacted, and a second contact lug electrically connected to the second contact element, by which second contact lug the shaft of the jack plug can be contacted, wherein a push element cooperating with the first contact element is present, which is displaceable from the annular plug extension in the direction towards the central longitudinal axis of the housing for contacting the first contact element with the first mating contact element of the mating plug upon insertion of the mating plug.

Further advantages and details of the invention are explained in the following with the aid of the exemplary embodiment of the invention represented in the attached drawing.

Figure 2:
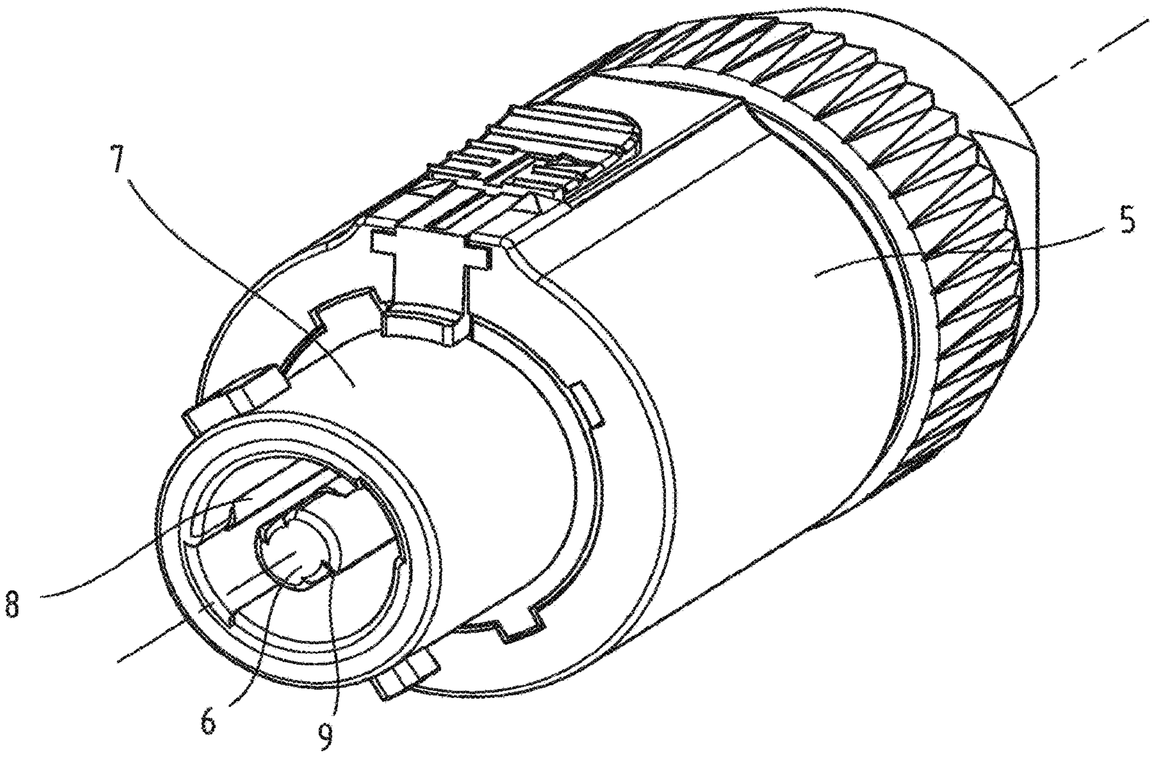
Figure 3:
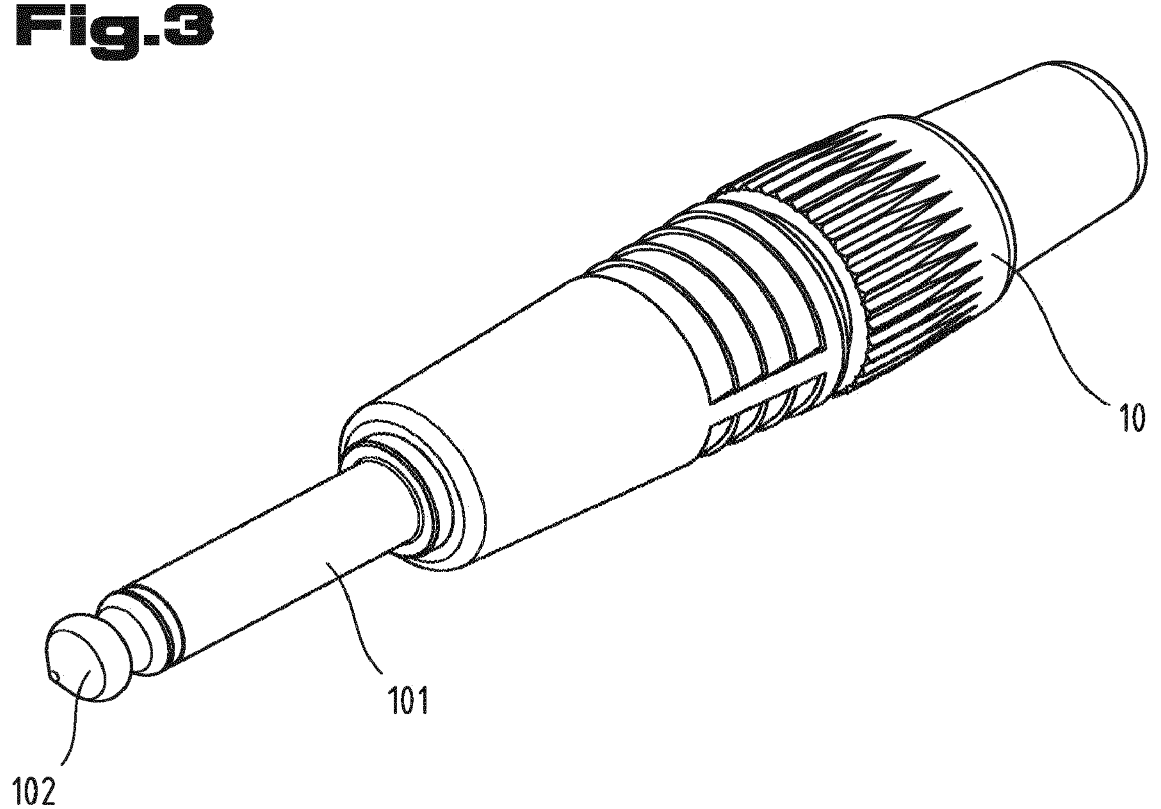
Figure 4:
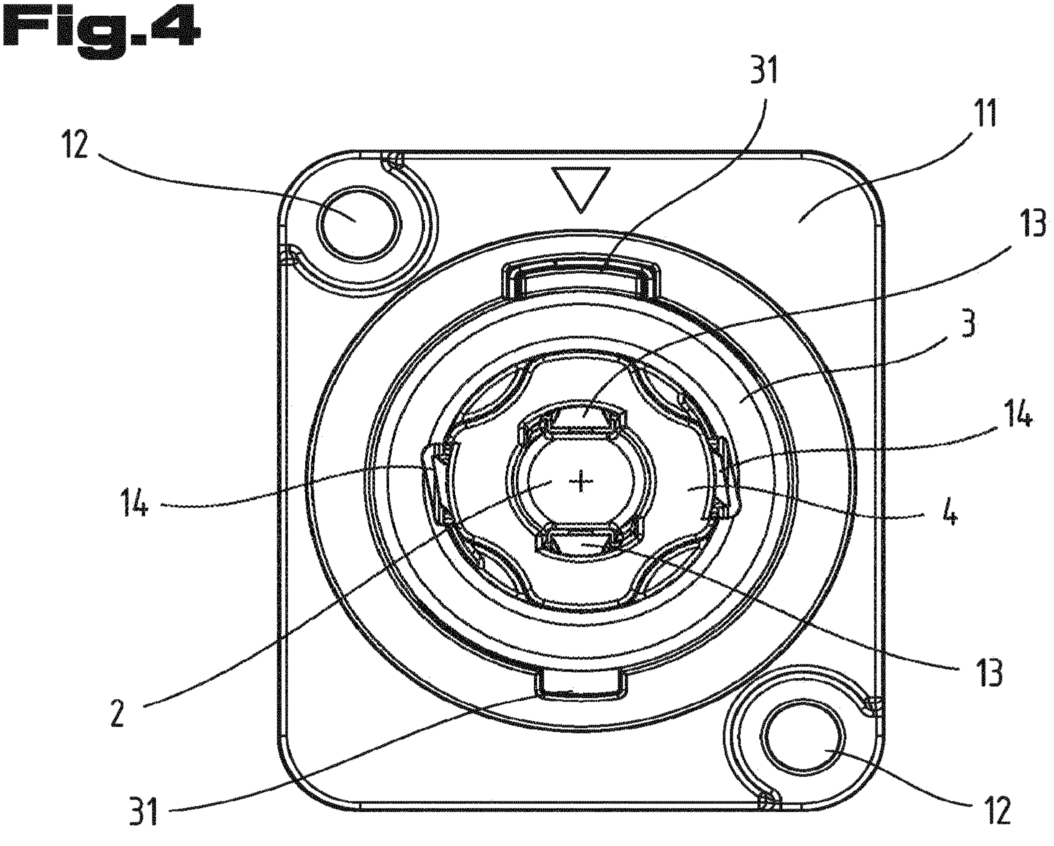

These show in a respectively very simplified schematic representation:

FIG. 1 a chassis plug socket as the preferred exemplary embodiment for a plug connector according to the invention, FIG. 2 a cable plug for establishing a plug connection with the chassis plug socket of FIG. 1, FIG. 3 a jack plug for establishing ab alternative plug connection with the chassis plug socket of FIG. 1, FIG. 4 a front view of the socket of FIG. 1

Figure 5:
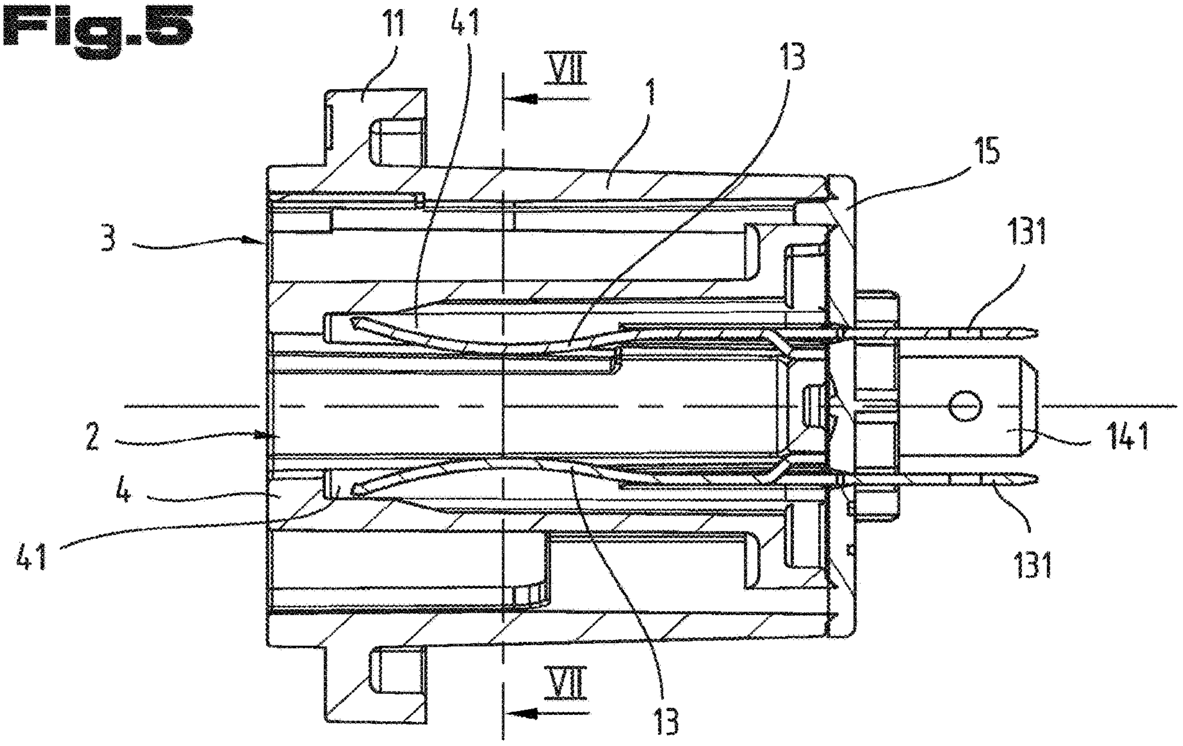
Figure 6:
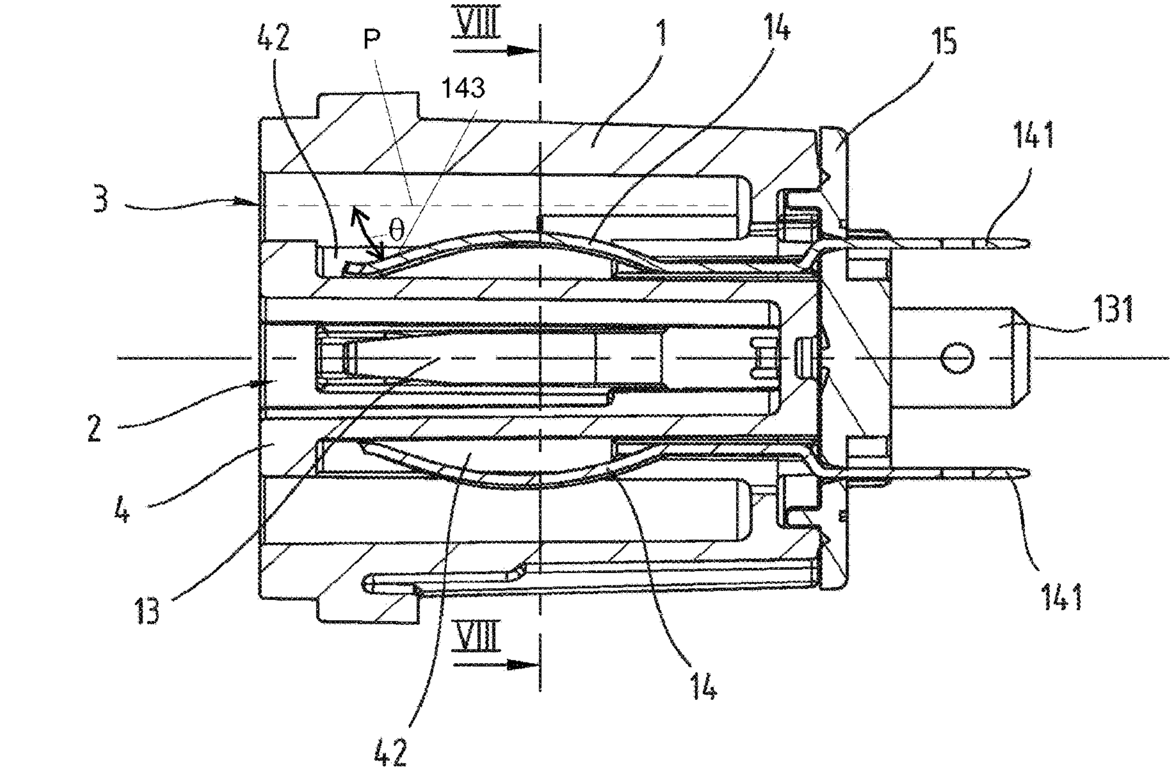
Figure 7:
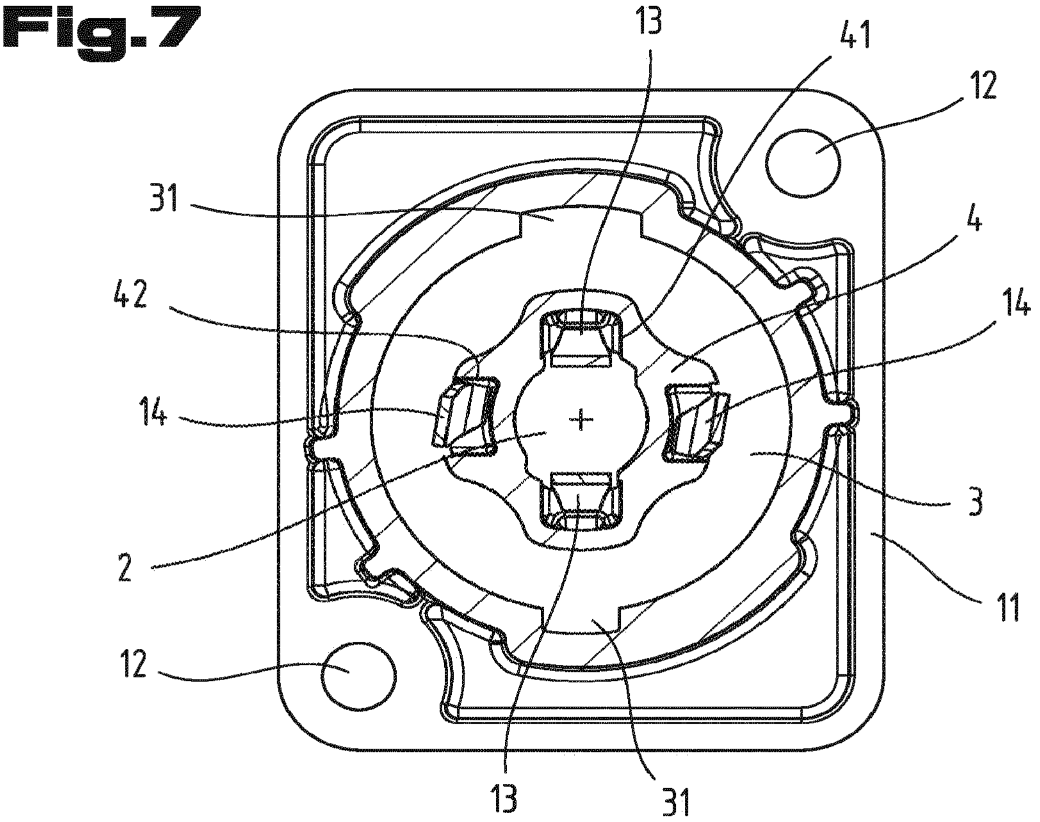
Figure 8:
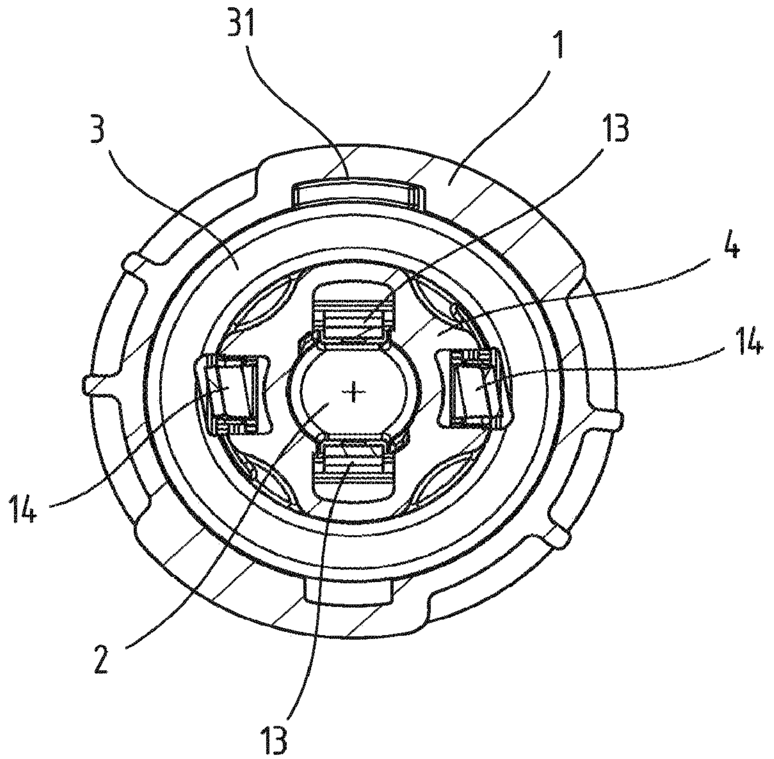
Figure 9:
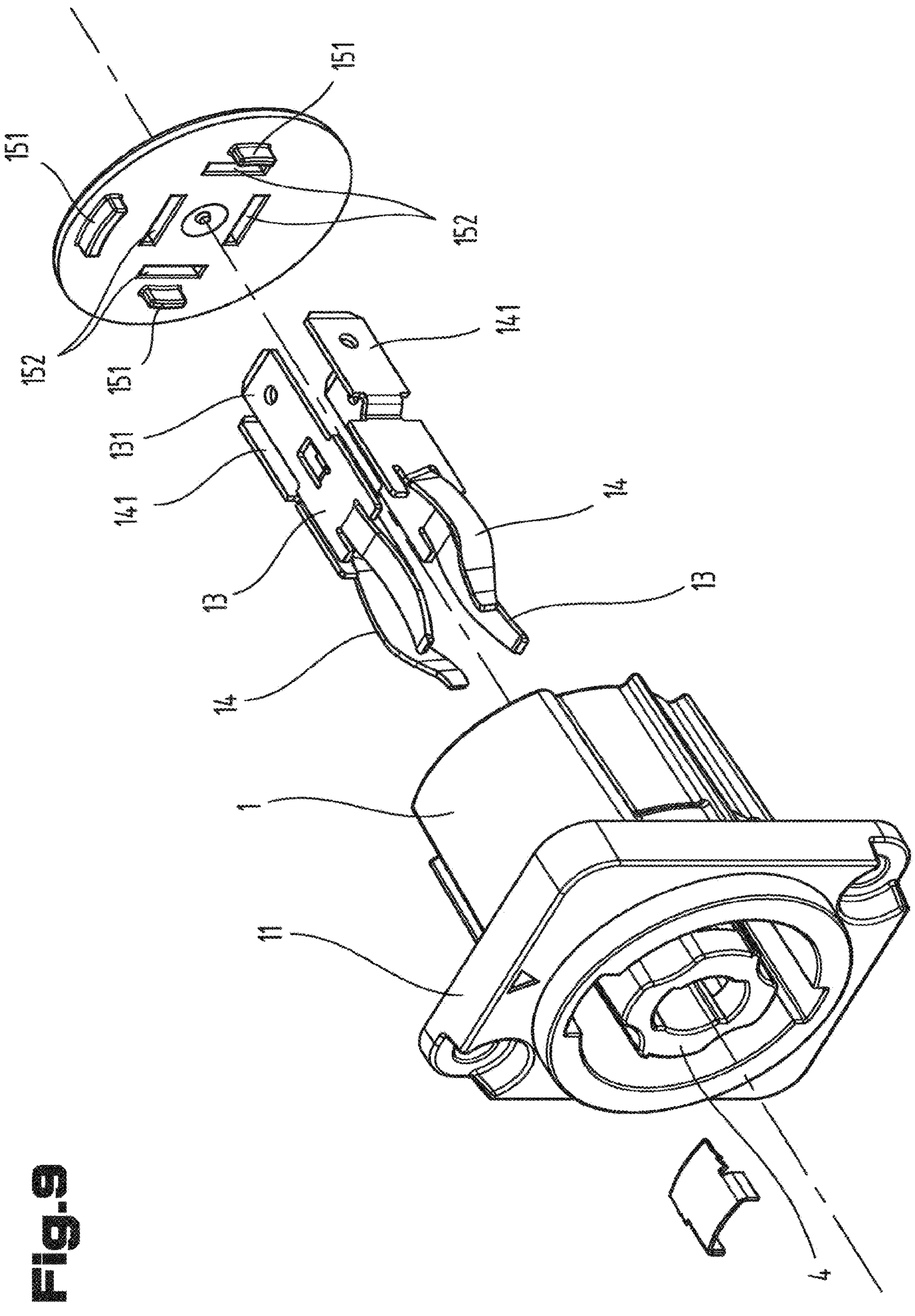
Figure 10:
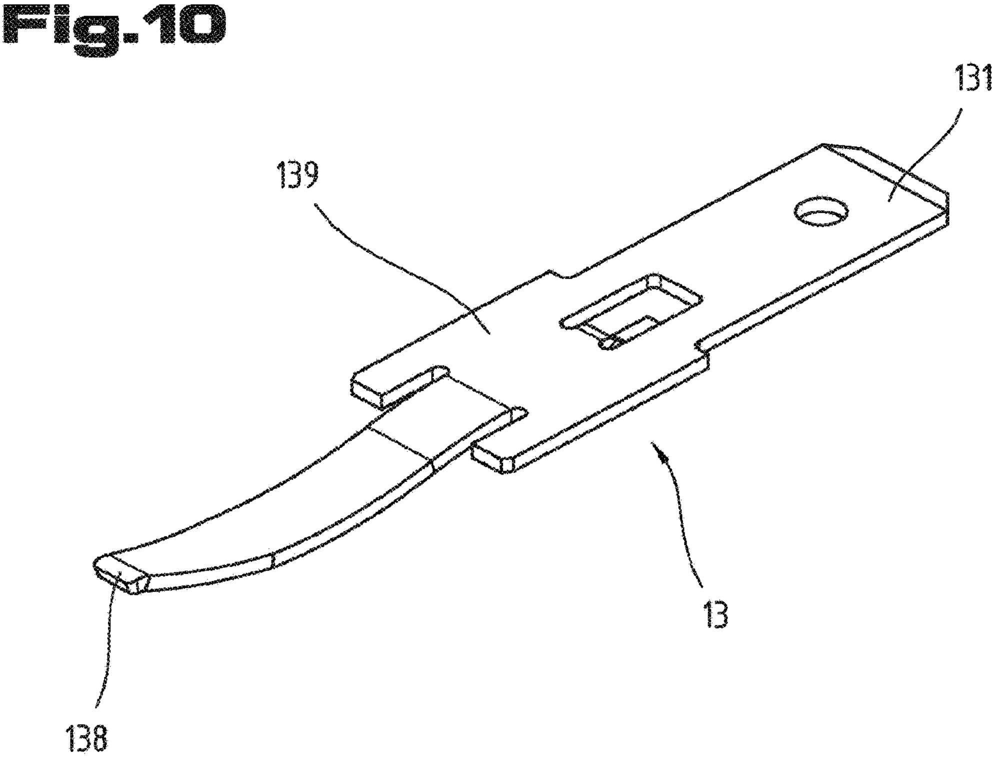
Figure 11:
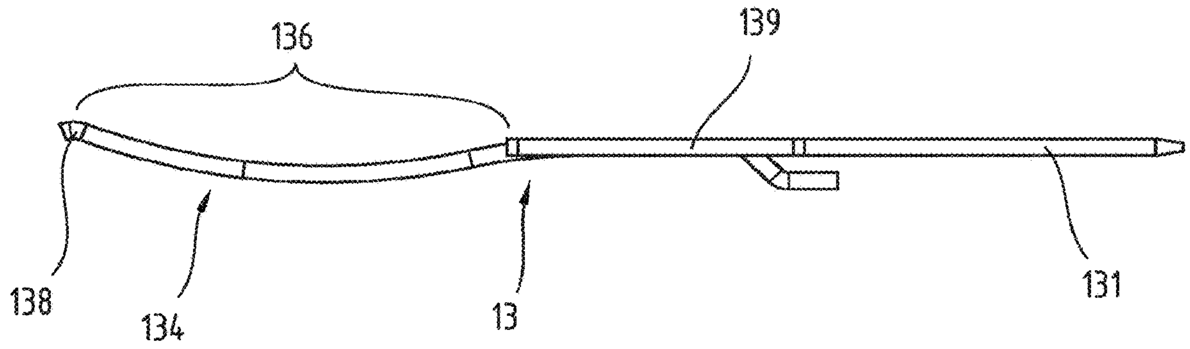
Figure 12:
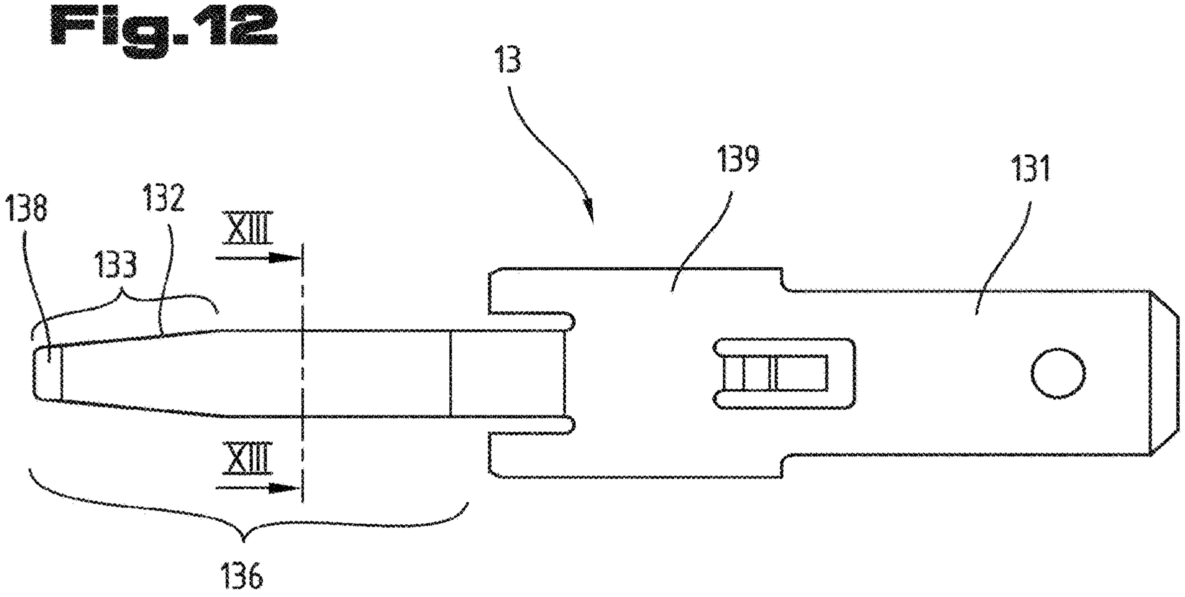
Figure 13:
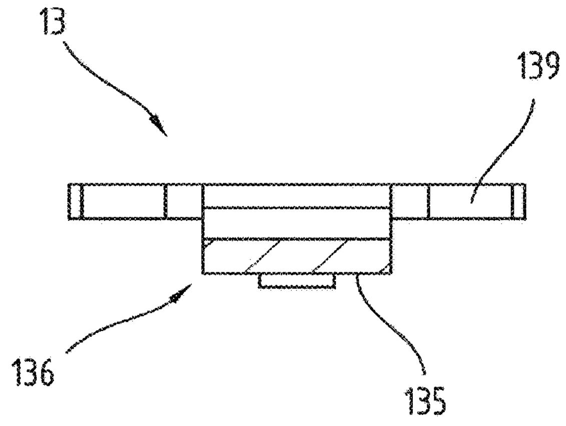
Figure 14:
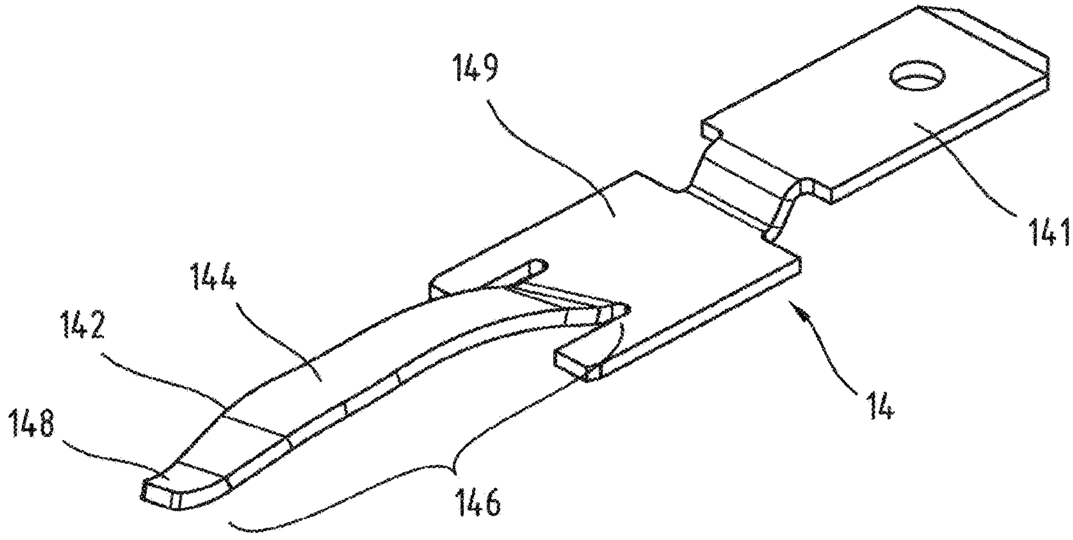
Figure 15:
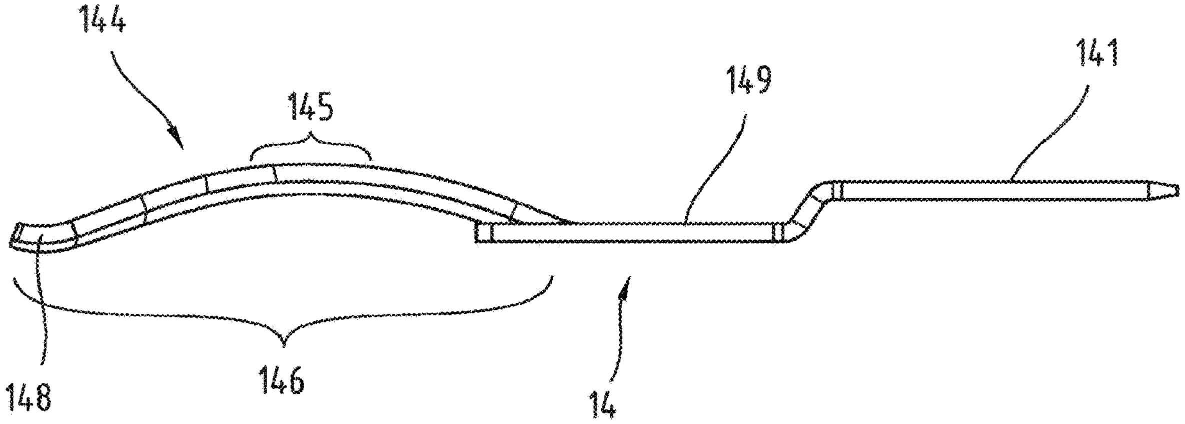
Figure 16:
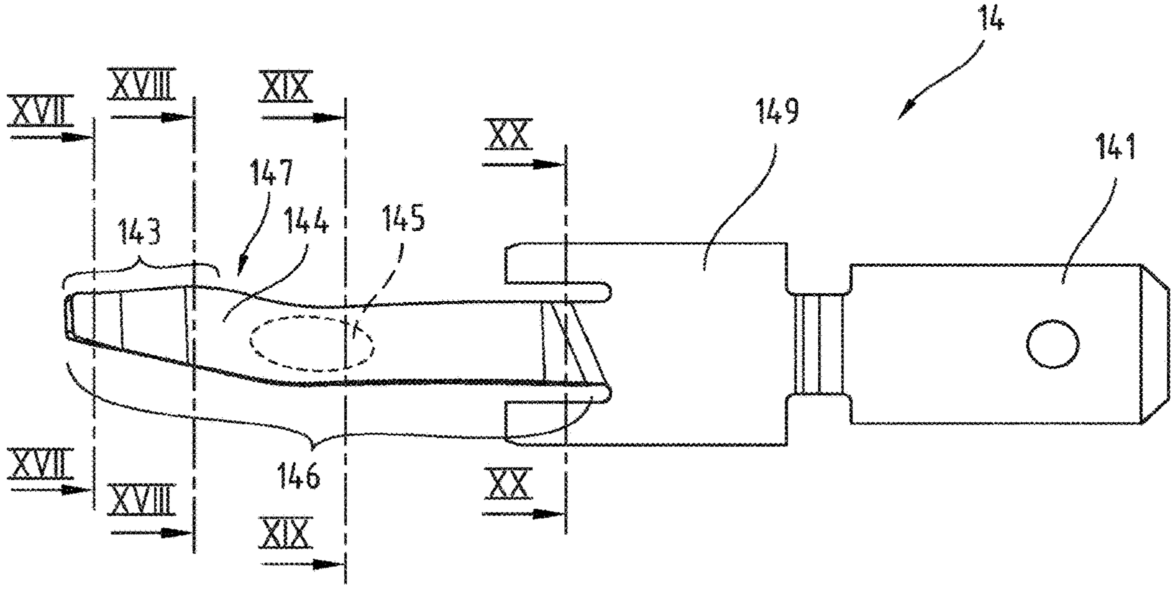
Figure 17:
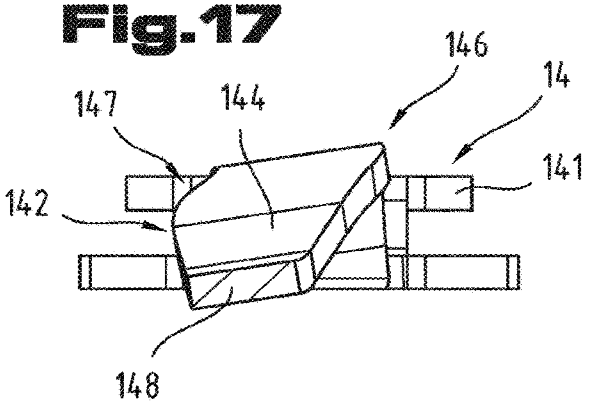
Figure 18:
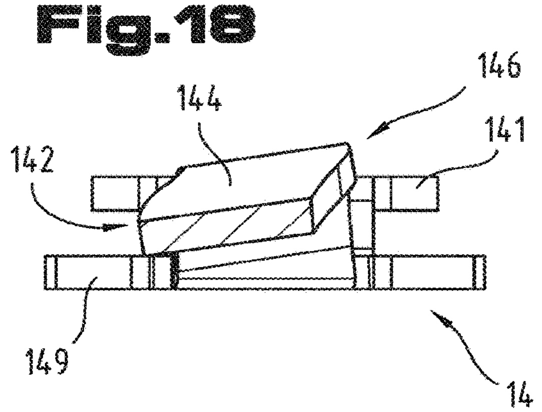
Figure 19:
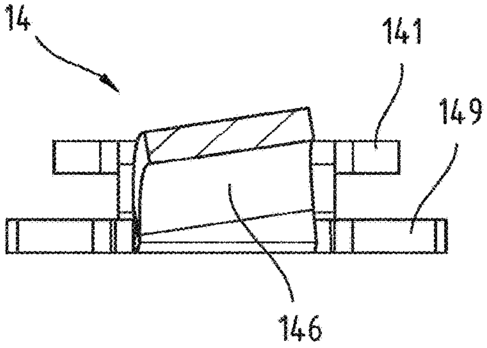
Figure 20:
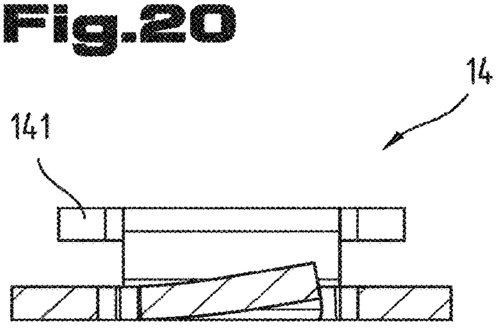

FIG. 5 a vertical longitudinal section through the socket of FIG. 1,

FIG. 6 a longitudinal section through the socket of FIG. 1 in the transverse direction, perpendicular to the section of FIG. 4, FIG. 7 a cross section through the socket of FIG. 1, perpendicular to its longitudinal axis, in the direction VII-VII, FIG. 8 a cross section through the socket of FIG. 1, perpendicular to its longitudinal axis, in the direction VIII-VIII, FIG. 9 an exploded view of the chassis plug socket of FIG. 1, FIG. 10 a perspective view of a first embodiment of a contact element for establishing the electrical contact with a plug pin of the cable plug, FIG. 11 a side view of the contact element of FIG. 10, FIG. 12 a top view onto the contact element of FIG. 10, FIG. 13 a cross section through a contact element of FIG. 10 at the height of line XIII-XIII of FIG. 12, FIG. 14 a perspective view of a further embodiment of a contact element for establishing the electrical contact with a plug pin of the cable plug, FIG. 15 a side view of the contact element of FIG. 14, FIG. 16 a top view onto the contact element of FIG. 14, FIG. 17 a cross section through a contact element of FIG. 14 at the height of line XVII-XVII of FIG. 16, FIG. 18 a cross section through a contact element of FIG. 14 at the height of line XVII-XVII of FIG. 16, FIG. 19 a cross section through a contact element of FIG. 14 at the height of line XVII-XVII of FIG. 16, and FIG. 20 a cross section through a contact element of FIG. 14 at the height of line XVII-XVII of FIG. 16.

The specifications of location, such as at the top, at the bottom, at the side, chosen in the description refer to the directly described and depicted figure and in case of a change of position, these specifications of location are to be analogously transferred to the new position.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field. Finally, as a matter of form, it should be noted that for ease of understanding of the structure, elements are partially not depicted to scale and/or are enlarged and/or are reduced in size.

The invention is described with the aid of a preferred exemplary embodiment of a built-in plug socket, also referred to as chassis socket, of which a typical exemplary embodiment is represented in the figures. FIG. 1 shows this socket in a perspective view. It serves for establishing an electrical plug connection with a mating plug of the type shown in FIG. 2 as well as, alternatively, with a jack plug of the type shown in FIG. 3.

The electrical plug connector shown in FIG. 1, in the shape of a built-in plug socket has a housing 1, in which a central insertion opening 2 and an outer annular insertion opening 3 is present. The housing 1 is made of electrically insulating material or is electrically insulated against the contact elements 13, 14. In this regard, the outer insertion opening 3 surrounds the central insertion opening 2 preferably coaxially, wherein both insertion openings 2, 3 are delimited from one another by means of an also preferably coaxial cylindrical partition wall 4. The partition wall 4 extends over at least a part of the circumference of the insertion openings 2, 3, preferably over more than half of the circumference. In a known manner, guides 31 may be provided, which ensure the rotation-free insertion of a complementary plug connector (see FIG. 2) into the outer annular insertion opening 3 and enable a subsequent rotation about the central axis of the plug connectors, in particular in order to mechanically lock the plug connection. Such an embodiment of the plug connectors is intended for connecting loudspeakers and amplifiers with two types of cable plugs, for example. A type of cable plugs (see FIG. 2) has a cable plug housing 5 and a central plug dowel pin 6, wherein at least one contact pin 9 is arranged on the dowel pin 6 on its cylindrical outer side. This central plug dowel pin 6 is surrounded, at a certain distance, by a cylindrical and/or annular plug extension 7, on whose inner side typically contact pins 8 are arranged, as well. On the other hand, the connection with typical jack plugs (see FIG. 3) with only one contact pin 101 protruding from the housing 10 is to be possible.

Base versions of the built-in plug connector provide a connection possibility with only one type of cable plug connector. In this regard, an insertion opening and a guide for a complementary cable plug connector is provided, which is equipped with at least one electrical contact pin. All features explained below also analogously apply, in a simplified manner, to these base versions.

By means of a contact flange 11 having mounting bores 12, the built-in plug connector can be installed and fixed in a control panel, in a wall of a device or the like.

For establishing the electrically conductive connection, at least one flat, strip-shaped or tongue-shaped electrical contact element 13, 14 that is elastically deflectable out of the path of the contact pin 8, 10 of the respective cable plug connector, which path is traveled by the contact pin 8, 10 in the insertion opening 2, 3, is affixed in the housing 1 for each insertion opening 2, 3. This contact element 13, 14 made of electrically conductive, preferably metallic material, protrudes at least partially into the respective insertion opening 2, 3 at least in case of a missing complementary plug connector. While inserting the complementary plug connector and/or its contact pins 8, 10 into the insertion opening 2, 3, the contact elements 13, 14 are contactable in the housing 1, whereby the electrically conductive connection between the cable plug connector and the built-in plug connector is established. On the rear side of the housing 1 opposite the insertion opening 2, 3, the contact elements 13, 14 are guided outwards and form the contact lugs 131, 141 on the rear side.

The exploded view in FIG. 9 shows that on the side opposite the insertion side for the complementary cable plug connector, the housing 1 is closed and preferably also sealed by a posterior rear wall 15. Dowel pins projecting from the rear wall 15 towards the housing 1 or elements 151 extending in the circumferential direction serve to guide and orient the rear wall 15 relative to the housing 1 and, in case of a relevant embodiment with undercuts, also as a means for locking the rear wall 15 to the housing 1. Alternatively or additionally, the rear wall 15 may also be joined with the housing by means of adhering, welding, preferably ultrasonic welding, bolting or the like. By means of openings 152 in the rear wall 15, the contact lugs 131, 141 are guided outwards.

The partition wall 4, which separates the central insertion opening 2 and the annular insertion opening 3 delimited therefrom, is designed to be at least partially hollow. As an alternative or an addition thereto, the partition wall 4 may also be provided with at least one groove-like recess. In the cavity and/or in the groove, at least one of the contact elements 13, 14 is arranged, wherein contact elements 13, 14 accommodated inside the partition wall 4 project into the insertion openings 2, 3 through recesses 41, 42 oriented in parallel with the longitudinal axis of the housing 1. Preferably, two grooves or cavities are provided, which each accommodate one of the contact elements 13, 14. The partition wall 4 may also be designed as a hollow-cylindrical ring, which has openings 41, 42 or grooves, which accommodate the contact elements 13, 14 or allow that they protrude into the region in which the contact pins or similar contact elements of the complementary plug connector come to rest during or after the plug connection has been established.

The contact element 13 protruding into the central insertion opening 2 can be deflected resiliently in the direction away from the central longitudinal axis of the housing 1 for accommodating the contact pin 101 of a jack plug 10.

However, in addition to the also provided resilient deflectability in the direction towards the central longitudinal axis of the housing 1, the outer contact element 14 protruding into the outer, annular insertion opening 2 from the inside is additionally designed in a manner ensuring a good start-up slope for the contact pin of the cable plug connector as well as the transferability of high currents due to good electrical contacting. For this purpose, it is provided that the lateral edge 142 of the contact element 14 facing a contact pin 8 of a cable plug connector (for this, see FIGS. 14 to 20), in its front section 143 facing the contact pin 8, encloses an acute angle, indicated as θ in FIG. 6, with the path P of the contact pin 8 during the insertion when viewed in the direction of deflection of the contact element 14. In the geometric sense, the path of the contact pin 8 and the tangent to the contact point of the contact element 14 are skew lines as they are not situated within the same plane. When inserting the contact pin 8 into the housing 1 according to the invention, its front end, usually designed as a rounded structure, contacts the lateral edge 142 of the contact element 14 of the housing 1 first and upon further insertion and sliding along the lateral edge 142 deflects the same elastically out of the rest position. This relative movement with sliding along—similar to the principle of the cutting edges of a pair of scissors—takes place until the front section of the contact pin 8 has run onto the flat upper side 144 of the contact element 14. The contact pin 8 may then either be pushed further forward or be moved away from the lateral edge 142 of the contact element towards its flat surface 144 by rotation of the complementary plug connector—for example as part of a bayonet-type lock of the plug connection—transversely to the longitudinal axis of the contact element 14. When the complementary plug connector is fully inserted, a contact region 145, which is flat, of the contact element 14 is in contact with the contact pin 8 following the lateral edge 142 and ensures an optimal electrical contacting. In this regard, the contact element 14, in its front deflectable section 146, has a convex curvature against the direction of deflection.

Preferably, the apex region of the curved section 146 of the contact element 14 is situated in the region of the foremost section of the contact pin when the complementary plug connector is fully inserted in order to ensure optimal contacting. This provides for an optimal press-on effect of the contact element 14 onto the contact pin 8 and for the existence of the greatest possible contacting surface between the two electrical contacts. The preferred exemplary embodiment of a contact element 14 also has a convex curvature in the direction towards the contact pin 8, which is advantageous particularly for plug connectors in which, upon inserting the cable plug connector into the built-in plug connector, the contact pin 8 of the cable plug connector is first situated slightly outside the longitudinal center of the curved and elastically deflectable section 146 (in FIG. 16, approximately parallel to the contact element 14 but slightly above its longitudinal center; in FIGS. 17 to 20 perpendicular to the drawing plane and for the time being left of the curved section 146 of the contact element 14). In this regard, the contact pin 8 is first guided along the lateral edge 143 of the contact element 14, similar to the sides of a pair of scissors, and in doing so, deflects the curved section 146 further and further against the curvature until, finally—and typically at the point of the greatest possible deflection of the contact element 14—the front section of the contact pin 8 of the cable plug connector runs onto the flat surface 144 of the curved section 146 of the contact element 14. Typically, afterwards, a relative rotation of the cable plug connector and built-in plug connector takes place in order to effect the locking of the plug connection. In FIG. 16, this movement takes place with a contact pin 8 being approximately parallel to the contact element 14, downwards in the drawing plane towards the longitudinal center of the curved section 146; in FIGS. 17 to 20, the contact pin 8 would be perpendicular to the drawing plane and would be moved from left to right along an arc section to the right onto the flat surface 144 of the contact element 14 to finally come to rest in the contact region 145.

This second curvature in the front section of the section 146 of the contact element 14 that is, in any case, curved in parallel with the direction of deflection, directed towards the contact pin 8 of the cable plug connector is, in this regard, a curvature transverse to the longitudinal axis of the contact element 14 and perpendicular to the direction of the deflection of the section 146. It may also only affect the one lateral edge 142 closer to the contact pin 8, which lateral edge 142 is the first to come into contact with the contact pin 8 of the cable plug when establishing the plug connection. The lateral, second curvature may, however, also affect both lateral edges, which then leads to a sickle shape of the deflectable section 146 transversely to the direction of deflection.

The apex region 147 of the lateral curvature is preferably situated in the foremost part of the curved section 146, between the front end of the contact element 14 and the contact region 145 of the curved section 146, on whose flat surface the foremost section of the contact pin 8 is situated when the plug connector is fully inserted. Hence, the contact pin 8 can slide along the lateral edge 142 upon insertion of the cable plug connector, wherein the contact point between the contact pin 8 and the contact element 14, in particular its curved section 146, increasingly shifts and migrates from the greatest distance from an imagined connection line between the contact pin 8 and the central axis of the cable plug connector towards said connection line. In the course of the rotation of the cable plug connector relative to the housing 1 of the built-in plug connector, the longitudinal center of the contact region 145 of the contact element 14 advantageously migrates into the connection line and the contact pin 8 and the contact region 145 abut one another with optimal contact, both regarding the contact surface and the contacting force.

The aforementioned advantages of the smooth and scissor-like sliding on of the contact pin 8 onto the contact element 14 may also be achieved with an embodiment of the contact element 14, whose front section, which is the first to come into contact with the contact pin 8 of the cable plug connector, is rotated about the longitudinal axis of the contacting, curved section 146. Both constructive features may also be realized together in the contact element 14, and a corresponding embodiment of the contact element 14 is also shown in the drawings. The rotation in the front region of the curved and deflectable section 146, facing the contact pin 8, can be seen particularly well in FIG. 17 to FIG. 20.

The lateral edge 142 of the contact element 14 coming into contact with the contact pin 8 may—in a projection in the direction of the deflection of the front section of the contact element 14—also be designed to be curved with respect to the path of the contact pin 8 in that the front section is designed to be rotated about its own axis. The extent of the rotation may also change preferably along the length of the deflectable section 146 of the contact element 14, wherein the greatest rotation is provided in the foremost region, which region is the first to come into contact with the contact pin 8 of the cable plug connector. FIG. 17 shows a cross-section transversely to the longitudinal direction of the contact element 17 shortly before this point, along the line XVII-XVII of FIG. 16, so that the strongly rotated section of the contact element can be seen from the direction of the contact pin 8.

The next cross-section of FIG. 18 is made at a slightly greater distance from the front end, along the line XVIII-XVIII of FIG. 16, and shows that the rotation at this location is already significantly less strong than in FIG. 17. In the projection in the direction of the deflection of the contact element 14, the lateral edge 142 is thus located slightly further from the longitudinal central axis, as it would correspond to a real curvature of the front section 146 of the contact element.

At the apex of the curved section 146 of the contact element 14, the curvature is already very small, as can be seen in FIG. 19, which shows a cross-section along the line XIX-XIX of FIG. 16. Directly behind this, this section of the contact element 15 transitions—offset in the direction towards the contact lug 141—into the section that is flat and not rotated with respect to the section 149 defined in the rear wall 15 and therefore parallel. The following section of the deflectable section 146 then continues from the apex of the curvature, without rotation, further to the flat, plate-shaped section 149, which serves the fastening in the rear wall 15, and then transitions into this section 149. This point is shown in a cross-section in FIG. 20, which is made along the line XX-XX of FIG. 16. In summary, it could also be worded that the rotation steadily increases from the tangential section up until shortly before the front end of the contact element.

As already adumbrated above, the rotation of the deflectable section 146 about its own longitudinal axis results in a spatial path for the contact point of the contact pin 8 of the cable plug connector inserted into the housing 1, which path, when viewed from radially outside the contact pin 8 but in the direction of the deflection of the contact element 14, leads from a greater lateral distance from the longitudinal central axis of the contact pin 8 towards congruency with a connection line, which extends in parallel with the direction of deflection and crosses the central axis of the contact pin 8. Thus, the desired curvature with respect to the path of the contact pin 8 arises in this projection. In each contact point along the aforementioned path, the tangent to the lateral edge 142 extends skew relative to the longitudinal central axis of the contact pin 8 and/or to the longitudinal axis of the contact element 14, which is given by the longitudinal central axis of the section 149 and/or the contact lug 141.

Preferably, the foremost section 148 of the deflectable section 146 of the contact element 14 is configured as a guide section, which is mounted so as to be displaceable in a guide structure of the housing 1, in particular the partition wall 4, in parallel with the longitudinal axis of the housing 1. Movements of the foremost end section 148 of the contact element 14 transversely to its longitudinal direction, however, are prevented by the guide structure, typically bag-like recesses at the end of the recess in the partition wall 4 or at the end of the groove elaborated in the partition wall 4 and accommodating the contact element 14. At the support point of the end section 148 on the housing 1, there will also be a longitudinal movement, i.e. a movement in the direction of the main longitudinal axis of the housing 1, forward in the direction of the insertion opening and/or visible surface of the housing 1 due to the contact element 14 being pushed away by the contact pin.

For establishing electrical contacts, in which the two electrical contact elements move relative to one another mainly in their longitudinal direction and only to a small extent transversely to this longitudinal direction, such a complex embodiment as described above is not necessarily required. Hence, particularly the contacting in the central insertion opening 2, in which a central dowel pin 6 of the cable plug connector is provided, as shown for example in FIG. 2, having at least one contact pin 9 of a cable plug connector mounted on its outer wall, preferably two opposing contact pins 9, can be achieved with a contact element 13 with a simpler shape. Such a contact element 13 for the central insertion opening 2 is shown in detail in FIG. 10 to FIG. 13. Here, it can also be seen that the contact surface 135 is located essentially on the highest point of the convexly curved section 136 of the contact element 13.

The contact element 13 preferably also has a resiliently deflectable tongue-shaped section 136, which is also curved convexly against the direction of its deflectability similar to the contact element 14, as can be seen clearly in FIG. 11. The contact element 13 also includes a flat contact section 134. When the cable plug connector is not inserted, at least this curved section 136 protrudes out of a receiving structure in the partition wall 4 into the insertion opening and into the path of the contact pin 9 to be inserted. The end section 138 of the contact element 13 is also preferably guided in parallel with the longitudinal axis of the built-in plug connector, and in the foremost section of the contact element 13, the lateral edge 132 extends obliquely to the longitudinal central axis of the contact element 13 and obliquely to the path of the contact pin 9 upon insertion into the insertion opening 2.

The fundamental operations and processes correspond to the features explained thus far, with the exception that, due to the smaller relative movements transversely to the longitudinal axes of the contact elements 9 of the cable plug connector and 13 of the built-in plug connector, the rotation of the rebounding section 136 is not necessary.

It should also be noted that the central insertion opening 2 of the built-in plug connector may also be configured for establishing a plug connection with the contact pin 101 of a conventional jack plug—as shown in FIG. 3. In addition to the contact region with the shaft of the contact pin 101, the contact element 13 is also equipped with contact regions for the contact tip 102 situated at the free end of the contact pin 101 of the jack plug. For this purpose, preferably at least one first contact lug electrically connected to the contact element 14 protruding outwards into the insertion opening 3, by which contact lug the contact tip 102 of the jack plug can be contacted, and a second contact lug electrically connected to the contact element 13 protruding inside the inner insertion opening 2, by which the shaft of the contact element 101 of the jack plug can be contacted, are provided. Moreover, advantageously, a push element cooperating with the contact element 14 is present. This is displaced by the annular plug extension in the direction towards the central longitudinal axis of the housing 1 for contacting the contact element 14 with the contact pin 9 of the cable plug connector upon its insertion.

| List of reference numbers | |
|---|---|
| 1 | Housing |
| 2 | Central insertion opening |
| 3 | Outer insertion opening |
| 4 | Partition wall |
| 5 | Cable connector |
| 6 | Dowel pin |
| 7 | Cylindrical plug extension |
| 8 | Contact pin |
| 9 | Contact pin |
| 10 | Jack plug |
| 11 | Mounting flange |
| 12 | Mounting bore |
| 13 | Contact element |
| 14 | Contact element |
| 15 | Rear wall |
| 31 | Guides |
| 41 | Opening |
| 42 | Opening |
| 101 | Contact pin |
| 102 | Contact tip |
| 131 | Contact lug |
| 132 | Lateral edge |
| 133 | Section with oblique lateral edge |
| 135 | Contact region with contact pin |
| 136 | Curved, springy section |
| 138 | Guided end section |
| 139 | Defined section |
| 141 | Contact lug |
| 142 | Lateral edge |
| 143 | Laterally curved section |
| 144 | Flat upper side |
| 145 | Contact region |
| 146 | Curved, springy region |
| 147 | Apex region of the lateral curvature |
| 148 | Guided end section |
| 149 | Defined section |
| 151 | Element for guiding and locking |
| 152 | Recess for contact lug |

The invention claimed is:

1. An electrical plug connector, having a housing (1), which has a central insertion opening (2) and an outer annular insertion opening (3), wherein the outer insertion opening (3) surrounds the central insertion opening (2) coaxially and is delimited from the central insertion opening (2) by an equally coaxial cylindrical partition wall (4), which extends at least over a part of the circumference of the central insertion opening (2), with at least one guide (31) for a complementary plug connector (5, 10) with at least one electrical contact pin (8, 9, 101), wherein the guides (31) ensure the rotation-free insertion of the complementary plug connector (5) into the outer annular insertion opening (3) and enable a subsequent rotation about the central axis of the plug connector and the complementary plug connector (1, 5), wherein at least one flat electrical contact element (13, 14) with a tongue-shaped design that is elastically deflectable out of a path of the contact pin (8, 9, 101) in the central insertion opening or the outer annular insertion opening (2, 3) is mounted in the housing (1) and protrudes into the central insertion opening or the outer annular insertion opening when the complementary plug connector is absent, wherein, when the complementary plug connector (5) is fully inserted, a flat contact section (134, 144) of the contact element (13, 14), adjoining a lateral edge (132, 142) of the flat contact section in the transverse direction, abuts in contact with the contact pin (8, 9), and wherein the flat electrical contact element (14) is arranged in a region of an outer side of the cylindrical partition wall (4) so as to extend in parallel with the axis of the insertion openings (2, 3) and is resiliently deflectable in the direction towards the central longitudinal axis of the housing (1), wherein the flat electrical contact element (14) has a convex curvature in the direction away from the central longitudinal axis of the housing (1), and the lateral edge (142) of this flat electrical contact element (14) facing the contact pin (8, 9), in its front section (143) facing the contact pin, encloses an acute angle with the path of the contact pin (8, 9) during the insertion when viewed in a direction of the lateral edge to show the deflection of the flat electrical contact element (14), wherein the front section (143) of the flat electrical contact element (14) cooperating with the contact pin (8) is rotated in the direction towards the contact pin (8), and a rotation steadily increases from a contact region (145) up to shortly before the front end (148) of the flat electrical contact element (14).

2. The plug connector according to claim 1, wherein the deflectable section (136, 146) of the flat electrical contact element (13, 14) has a convex curvature against the direction of deflection, wherein an apex region is situated in a region of a foremost section of the contact pin (8, 9) when the complementary plug connector is fully inserted.

3. The plug connector according to claim 1, wherein the flat electrical contact element (14) has a convex curvature transverse relative to its longitudinal axis in the direction towards the contact pin (8), wherein an apex region (147) is situated in a region of a foremost section of the contact pin (8) when the complementary plug connector (5) is fully inserted.

4. The plug connector according to claim 1, wherein the flat electrical contact element (14) is guided coaxially relative to the insertion direction at its end (148) closest to the insertion side, wherein a contact region (145) of the first contact element (14) is situated between end sections (148, 149) thereof.

5. The plug connector according to claim 1, wherein at least one second flat electrical contact element (13) is arranged in the central insertion opening (2) and is resiliently deflectable in the direction away from the central longitudinal axis of the housing (1).

6. The plug connector according to claim 1, wherein the partition wall (4), which separates the central insertion opening (2) and the annular insertion opening (3) delimited therefrom, is at least partially hollow and/or provided with at least one groove-like recess, wherein at least one of the contact flat electrical elements (13, 14) is arranged in a cavity or a groove-shaped recess, and contact regions (135, 145) protrude out of the cavity or the groove-shaped recess.

7. The plug connector according to claim 1, wherein the housing (1) is designed as a socket-shaped housing insertable into a plate, housing wall or the like and has a protruding flange (11) on an insertion side into which the complementary plug connector is inserted for being mounted on the plate, housing wall or the like, and the flat electrical contact elements (13, 14) are mounted at a rear end on a base of the socket-shaped housing (1).

8. An electrical plug connector, having a housing (1), which has a central insertion opening (2) and an outer annular insertion opening (3), wherein the outer insertion opening (3) surrounds the central insertion opening (2) coaxially and is delimited from the central insertion opening (2) by an equally coaxial cylindrical partition wall (4), which extends at least over a part of the circumference of the central insertion opening (2), with at least one guide (31) for a complementary plug connector (5, 10) with at least one electrical contact pin (8, 9, 101), wherein the guides (31) ensure the rotation-free insertion of the complementary plug connector (5) into the outer annular insertion opening (3) and enable a subsequent rotation about the central axis of the plug connector and the complementary plug connector (1, 5), wherein at least one flat electrical contact element (13, 14) with a tongue-shaped design that is elastically deflectable out of a path of the contact pin (8, 9, 101) in the central insertion opening or the outer annular insertion opening (2, 3) is mounted in the housing (1) and protrudes into the central insertion opening or the outer annular insertion opening when the complementary plug connector is absent, wherein, when the complementary plug connector (5) is fully inserted, a flat contact section (134, 144) of the contact element (13, 14), adjoining a lateral edge (132, 142) of the flat contact section in the transverse direction, abuts in contact with the contact pin (8, 9), and wherein the flat electrical contact element (14) is arranged in a region of an outer side of the cylindrical partition wall (4) so as to extend in parallel with the axis of the insertion openings (2, 3) and is resiliently deflectable in the direction towards the central longitudinal axis of the housing (1), wherein the flat electrical contact element (14) has a convex curvature in the direction away from the central longitudinal axis of the housing (1), and the lateral edge (142) of this flat electrical contact element (14) facing the contact pin (8, 9), in its front section (143) facing the contact pin, encloses an acute angle with the path of the contact pin (8, 9) during the insertion when viewed in a direction of the lateral edge to show the deflection of the flat electrical contact element (14), wherein the front section (143) of the flat electrical contact element (14) cooperating with the contact pin (8) is rotated in the direction towards the contact pin (8), and the lateral edge (142) cooperating with the contact pin (8) extends in parallel with the longitudinal center of the flat electrical contact element (14) and the acute angle between the path of the contact pin (8) and the lateral edge (142), is effected by rotation of the front section of the flat electrical contact element (14).

9. An electrical plug connector, having a housing (1), which has a central insertion opening (2) and an outer annular insertion opening (3), wherein the outer insertion opening (3) surrounds the central insertion opening (2) coaxially and is delimited from the central insertion opening (2) by an equally coaxial cylindrical partition wall (4), which extends at least over a part of the circumference of the central insertion opening (2), with at least one guide (31) for a complementary plug connector (5, 10) with at least one electrical contact pin (8, 9, 101), wherein the guides (31) ensure the rotation-free insertion of the complementary plug connector (5) into the outer annular insertion opening (3) and enable a subsequent rotation about the central axis of the plug connector and the complementary plug connector (1, 5), wherein at least one flat electrical contact element (13,

14) with a tongue-shaped design that is elastically deflectable out of a path of the contact pin (8, 9, 101) in the central insertion opening or the outer annular insertion opening (2, 3) is mounted in the housing (1) and protrudes into the central insertion opening or the outer annular insertion opening when the complementary plug connector is absent, wherein, when the complementary plug connector (5) is fully inserted, a flat contact section (134, 144) of the contact element (13, 14), adjoining a lateral edge (132, 142) of the flat contact section in the transverse direction, abuts in contact with the contact pin (8, 9), and wherein the flat electrical contact element (14) is arranged in a region of an outer side of the cylindrical partition wall (4) so as to extend in parallel with the axis of the insertion openings (2, 3) and is resiliently deflectable in the direction towards the central longitudinal axis of the housing (1), wherein the flat electrical contact element (14) has a convex curvature in the direction away from the central longitudinal axis of the housing (1), and the lateral edge (142) of this flat electrical contact element (14) facing the contact pin (8, 9), in its front section (143) facing the contact pin, encloses an acute angle with the path of the contact pin (8, 9) during the insertion when viewed in a direction of the lateral edge to show the deflection of the flat electrical contact element (14), wherein two of the flat electrical contact elements (14) are arranged on opposite sides of the partition wall (4) with respect to the axis of the insertion opening (2), are curved convexly in the direction away from the central longitudinal axis of the housing (1), and are resiliently deflectable in the direction towards the central longitudinal axis of the housing (1).

10. An electrical plug connector, having a housing (1), which has a central insertion opening (2) and an outer annular insertion opening (3), wherein the outer insertion opening (3) surrounds the central insertion opening (2) coaxially and is delimited from the central insertion opening (2) by an equally coaxial cylindrical partition wall (4), which extends at least over a part of the circumference of the central insertion opening (2), with at least one guide (31) for a complementary plug connector (5, 10) with at least one electrical contact pin (8, 9, 101), wherein the guides (31) ensure the rotation-free insertion of the complementary plug connector (5) into the outer annular insertion opening (3) and enable a subsequent rotation about the central axis of the plug connector and the complementary plug connector (1, 5), wherein at least one flat electrical contact element (13, 14) with a tongue-shaped design that is elastically deflectable out of a path of the contact pin (8, 9, 101) in the central insertion opening or the outer annular insertion opening (2, 3) is mounted in the housing (1) and protrudes into the central insertion opening or the outer annular insertion opening when the complementary plug connector is absent, wherein, when the complementary plug connector (5) is fully inserted, a flat contact section (134, 144) of the contact element (13, 14), adjoining a lateral edge (132, 142) of the flat contact section in the transverse direction, abuts in contact with the contact pin (8, 9), and wherein the flat electrical contact element (14) is arranged in a region of an outer side of the cylindrical partition wall (4) so as to extend in parallel with the axis of the insertion openings (2, 3) and is resiliently deflectable in the direction towards the central longitudinal axis of the housing (1), wherein the flat electrical contact element (14) has a convex curvature in the direction away from the central longitudinal axis of the housing (1), and the lateral edge (142) of this flat electrical contact element (14) facing the contact pin (8, 9), in its front section (143) facing the contact pin, encloses an acute angle with the path of the contact pin (8, 9) during the insertion when viewed in a direction of the lateral edge to show the deflection of the flat electrical contact element (14), wherein the central insertion opening (2) is configured to receive a jack plug (10), and contact elements for a shaft (101) of the jack plug (10) and a contact tip (102) of the jack plug (10) arranged at a free end of the shaft (101) is present, which comprises at least a first contact lug electrically connected to the first contact element (14), by which first contact lug the contact tip (102) of the jack plug (10) is adapted to be contacted, and a second contact lug electrically connected to the second contact element (13), by which second contact lug the shaft (101) of the jack plug (10) is adapted to be contacted.

* * * * *